United States Patent Office 3,338,820
Patented Aug. 29, 1967

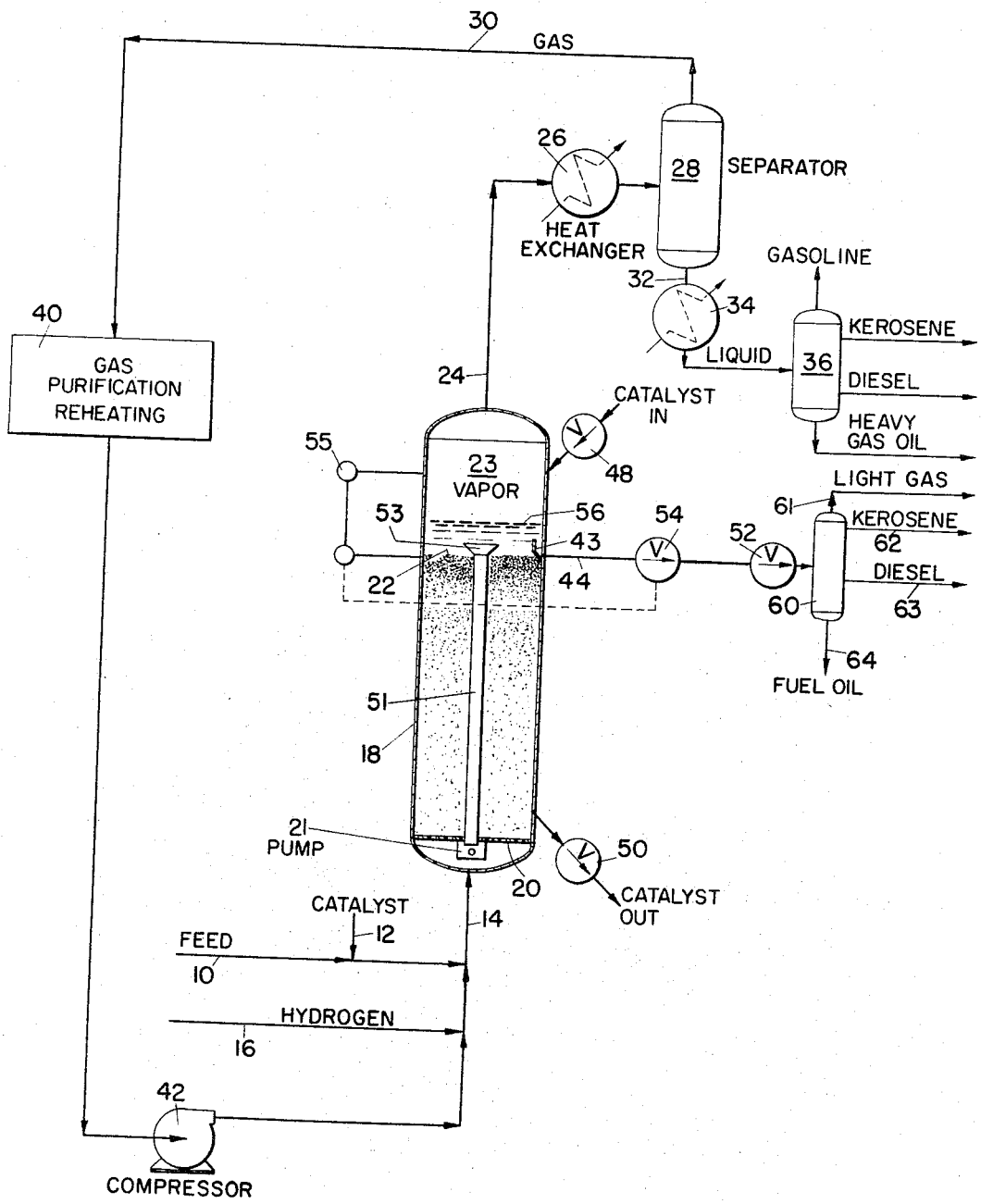

3,338,820
HIGH CONVERSION LEVEL HYDROGENATION OF RESIDUUM
Ronald H. Wolk, Lawrence Township, Mercer County, and Seymour B. Alpert, Princeton, N.J., assignors to Hydrocarbon Research, Inc., New York, N.Y., a corporation of New Jersey
Continuation of application Ser. No. 418,703, Dec. 16, 1964. This application Nov. 29, 1966, Ser. No. 611,496
3 Claims. (Cl. 208—108)

ABSTRACT OF THE DISCLOSURE

Converting residual oils to lower boiling materials by hydrogenation in an ebullated catalytic bed and separately withdrawing without cooling, vaporous and liquid effluents.

This application is a continuation of our application, Ser. No. 418,703, filed Dec. 16, 1964, now abandoned.

This invention relates to improvements in the method of converting residual oils to lower boiling materials. It specifically concerns itself with maintaining an operable system at higher degrees of conversion than have been possible heretofore.

When converting a residuum by destructive hydrogenation the primary objective is to obtain as high a level of conversion of the residuums as is compatible with long on-stream times. The ultimate goal is, of course, to convert all of the charge stock boiling above 975° F. to lower boiling material such as gasoline, kerosene, jet fuel, diesel oil and heavy gas oil with the complete elimination of low grade liquids such as heavy fuel oil.

This is, of course, theoretically possible, but any cracking of oil, including cracking in the presence of hydrogen, tends to release very high molecular weight asphaltenic type compounds which evidence themselves as sediment (which is determinable by centrifuging) in the product. These materials tend to poison the catalyst and in particular precipitate and deposit themselves on pipes and heat exchanger surfaces. Furthermore, if proper hydrogenation conditions and catalyst activity are not maintained within the reactor, it is possible to coke the contents of the reactor and thereby shut down the entire system.

It is understood that when converting a residuum by destructive hydrogenation under the necessary high temperature and pressure conditions, that many reactions take place including saturation, polymerization, cracking, desulfurization, denitrogenation, hydrogenation and similar reactions which all proceed simultaneously although usually at different rates. The results, then, are basically empirical and are functions of feedstock characteristics, temperature, pressure, space velocity, hydrogen rate, catalyst type, and catalyst activity.

The catalytic hydrogenation of residuum is well known and in the patent of Johanson, 2,987,465, a process is disclosed wherein the reaction is accomplished in the liquid phase with the heated residuum and hydrogen passed upwardly through a bed of catalyst at such a rate as to force the particles of catalyst into random motion. The majority of the liquid passing through the bed can be recycled from a point above the top of the catalyst bed back through the inlet at the bottom.

One of the unique features of such a system is that operating conditions are controlled so as to eliminate any substantial carryover of catalyst from the reaction zone. The most critical feature of this type of operation is that the reaction zone is maintained at substantially isothermal conditions. It is therefore possible to utilize a higher average temperature, and because of the avoidance of high local temperatures, the catalyst tends to remain cleaner for longer periods of time. In addition, due to the upward flow of the reactants and the expansion of the bed, any coke that might be formed is passed through the bed without difficulties, and the total pressure drop across the bed does not change.

In recent operations utilizing a system such as Johanson teaches, conditions that necessitated the shut down of the unit resulted when an attempt to obtain high conversion levels was being carried out. These conditions were evidenced by the plugging of those lines through which the total reactor effluent was flowing. It appears that the peptizing oil phase of the charge stock which holds asphaltenes in suspension was more readily converted than the asphaltenic fraction. This left a potentially unstable solution which precipitated asphaltenes on contact with light paraffinic materials.

These observations indicate that for a particular residuum a yield of precipitated asphaltenes or sediment develops which is beyond acceptable conditions in terms of maintaining operability when conversion levels reach what appears to be a critical value. More specifically, as we tended to exceed 60% conversion of residuum feed to lower boiling products, these severe operating difficulties were encountered. The restrictions in the effluent lines were most pronounced at the point where lighter component boiling below about 600° F. and particularly those boiling below 400° F., which are in the vapor phase at the reactor temperatures, were condensed downstream of the reactor and became intimately mixed with the reactor liquid. When this mixing occurred, asphaltenic materials in the liquid were precipitated, which coated the pipes and lines and ultimately plugged them. The liquid effluent from the reactor, because of the presence of some heavy naphtha and kerosene can also, upon cooling, release a high amount of sediment. We have found it to be advantageous in some cases not to cool this stream upon leaving the reactor. It is far superior to take the material directly to a fractionator where the naphtha, kerosene and light diesel products can be distilled off. This leaves a heavy liquid which, when cooled, has very little sediment and water. By handling the liquids this way the heavy fuel oil fraction can be cooled with absolutely no fouling or with much reduced amount of fouling of all pipes and heat exchanger surfaces. It should be pointed out that feedstocks having 5 wt. percent or higher original concentration of asphaltenes are more likely to cause these difficulties.

The objectives of our invention are thus to permit an extended on-stream period of hydrogenation reaction on residuum and to permit the increase of conversion level of such reaction whereby the maximum yield of valuable products can be produced.

Further objects and advantages of our invention will appear from the following description of a preferred form of embodiment thereof when taken with the attached drawing which is a schematic view of a hydrogenation process for high conversion of hydrocarbon oils.

As more specifically shown in the drawing, a feed 10 of a residuum may be combined with a catalyst 12 and fed by line 14 with hydrogen from line 16 through a reactor generally designated 18. As taught in the Johanson patent above referred to, the reactor may have a liquid distributor and catalyst support 20 so that the liquid and gas passing upwardly through the reactor 18 will tend to put the catalyst in random motion.

The catalyst particle size range is usually a narrow size range for uniform expansion under controlled liquid and gas flow conditions. While the overall range is usually between 3 and 270 mesh (Tyler), we contemplate a so-called once through operation using catalyst in the 80—

270 mesh range with a liquid velocity in the order of 1–10 gallons per minute per square foot of horizontal reaction space. Alternatively, larger catalyst, usually in the 3–20 mesh size, can be used by adequate recycle of heavy oil to provide from about 10 to 60 gallons total liquid per minute per square foot of horizontal reactor space. The lifting effect of the hydrogen is also a factor in the buoyancy of the catalyst.

By control of the catalyst particle size and density and liquid and gas velocities and taking into account the viscosity of the liquid under the operating conditions, the catalyst bed may be expanded to have a definite level or interface indicated at 22 in the liquid. It will be apparent that the settled level of the catalyst, as when the liquid rate drops below a sustaining value, will be considerably lower than level 22. Normally, bed expansion should be at least 10% and seldom over 300% of the static level, and the liquid rate will be in the range of 1 to 60 gallons per minute per square foot of horizontal cross section of the reactor.

In a reactor system of this type, we provide a vapor space 23 from which a vapor overhead, completely free of liquid is removed at 24. This may be conveniently cooled and partially condensed in heat exchanger 26 and separated in separator 28 into a gaseous portion removed overhead at 30, and a liquid portion removed at 32. The gaseous portion 30, which is largely hydrogen, may be purified by conventional means 40 and after being reheated, can be recycled through compressor 42 to the feed line 14 to the reactor.

The liquid portion 32 from separator 28 is cooled in heat exchanger 34 and then fractionated in distillation column 36 into fractions boiling in the gasoline range (overhead), kerosene and diesel oil (side streams), and a heavy gas oil (bottoms).

A heavy liquid, free of catalyst, is separated from the liquid effluent in the upper part of reactor 18 by trap tray 43, such liquid in line 44 passing through reducing valve 52 and being fractionated without cooling, in distillation column 60. Preferably, light products such as light gas, are removed overhead at 61, and kerosene and diesel oil boiling range materials are removed as side streams 62 and 63. A fuel oil fraction is removed at 64 as bottoms.

It is highly important that the fractionation of this heavy liquid be accomplished without prior cooling that would tend to condense any of the light hydrocarbons inasmuch as this causes the objectionable precipitation of sediment hereinbefore referred to. Usually temperatures lower than 700° F. should be avoided.

The hydrogenation reaction is facilitated by the use of catalyst and if a finely ground catalyst is used, it is effectively introduced to the reactor at 12 wherein it may be added continuously in the desired concentration as in a slurry. Catalyst may also be added to the reactor 18 through suitable inlet means 48 and withdrawn by suitable draw-off means 50.

Circulation of liquid from above the interface 22 to below the distributor deck 20 is usually desirable to assure completeness of the reaction and to establish a sufficient upflow liquid velocity to assist in maintaining the catalyst in random motion (ebullated) in the liquid. This is preferably accomplished by the use of a central conduit 51 having an enlarged conical or funnel type cap 53. The conduit extends to a pump 21 below the distributor deck 20 to assure a positive and controlled movement of the liquid downwardly. We find that there should be a maximum velocity of 0.4 foot per second, as measured in the middle elevation of the funnel type cap 53 (which is a frustum of a right cone) to assure the complete separation of gas bubbles in the downflowing liquid.

It is necessary to eliminate any gas bubbles from the liquid being drawn off at 44 as heavy product to assure continuous liquid flow without deposit of sediment. Also it is, of course, necessary to eliminate the presence of gas bubbles in the internal tube 51 which would otherwise bind the recycle pump 21 and result in a lowered flow rate through the system. If this occurs, it is possible that the flow rate would be so low as to cause the catalyst bed to slump which would then result in excessive temperature regions in the reactor. These gas bubbles, being largely hydrogen, are also of value if drawn off as a vapor for reuse. Their recovery and recycle otherwise is somewhat difficult.

Design and operation of the vapor section 23 of the reactor is critical to the successful operation of the entire plant. As above noted, vapors and gas bubbles must be removed. In addition, the vapor stream must be free of droplets or mist for the asphaltenic materials present in these liquid droplets will be completely precipitated by the high ratio of paraffinic naphtha that is present when all of the condensible materials in this stream are in the liquid form. This would, of course, result in fouling of all exchanger surfaces, pipe surfaces, valves and vessel walls.

At the same time it is necessary to minimize this vapor space so as to reduce the amount of thermal cracking of vapor. Such cracking in the vapor space 23 would result in a yield of olefinic materials which tend to polymerize. Valve 54 on the heavy liquid drawoff line 44 is interconnected by control 55 to establish continuous, and uniform operating conditions once the liquid level is established. This is accomplished, for particular operating conditions, as by sampling or inspecting the overhead and maintaining at least a minimum liquid level 56 over the cap 53 on the recycle conduit 51.

The recycle of liquid through internal conduit 51 has many mechanical advantages and tends to eliminate external high pressure connections as would be required in a hydrogenation reactor. Nevertheless, as described in the aforementioned Johanson patent, recycle can be established by an external pump on heavy liquid line 44 with a connection back to feed line 14.

The following examples are illustrative of operations in accordance with this invention.

*Example I*

A bench scale reactor having a capacity of 1000 cc. was used to process West Texas sour vacuum residuum to a conversion of 90% of the 975° F.+ material boiling in the feed to lighter product.

Operating conditions were:

Total pressure _____ 3000 p.s.i.g.
Hydrogen pressure _____ 2250 p.s.i.
Reactor temperature ____ 850° F.
Catalyst _____ Cobalt molybdate on alumina.
Liquid upflow rate _____ 60 gals./min./sq. ft.

The feedstock inspections are presented in Table I.

TABLE I.—INSPECTIONS ON CHARGE STOCKS

| Feed | West Texas Sour Vac. Bottoms | Mid Continent Vac. Bottoms |
|---|---|---|
| Gravity, ° API | 9.3 | 14.9 |
| Sulfur, wt. percent | 3.25 | 1.05 |
| Hydrogen/Carbon: Atomic Ratio | 1.44 | 1.58 |
| Ramsbottom Carbon, wt. percent | 13.2 | 10.9 |
| Sediment and Water, vol. percent | 0.3 | |
| Benzene Insoluble, wt. percent | | 0.005 |
| IBP, 975° F: | | |
| Volume percent | 10.0 | |
| Gravity, ° API | 21.9 | |
| Sulfur, wt. percent | 2.35 | |
| Ramsbottom Carbon wt. percent | 0.9 | |
| 975° F.+: | | |
| Volume percent | 90.0 | 100 |
| Gravity | 8.5 | |
| Sulfur, wt. percent | 3.37 | |
| Ramsbottom Carbon, wt. percent | 20.8 | |

After 138 hours on stream the product line carrying the total effluent from the reactor to the high pressure separator plugged off. This necessitated shutting down the unit. A restriction of carbonaceous material was found in this product line.

In order to alleviate this condition, the run was repeated with a change in the product handling system. The total product was removed from the reactor and taken to a separator operating at 700° F. wherein the vapor and liquid streams were separated. Distilling the collected liquid into 600° F.+ and 600° F.− fractions resulted in a sediment and water in the 600° F.+ fraction of 0.5 wt. percent and a value of 0.0 in the 600° F.−. This clearly indicates the advisability of fractionating the liquid coming from the reactor before heat exchanging it. There is no real heat loss to the system because the superheated feed to the fractionator provides the necessary heat for distillation. The results clearly show that if the streams could have been separated at the reactor even less sediment and water would have been found in the liquid product. No separation in the unit could be attempted because of its small size. The inspections for each of the products are given in Table II:

TABLE II.—CONVERSION OF WEST TEXAS SOUR VACUUM BOTTOMS

| | Inoperable Case | Operable Case | | |
|---|---|---|---|---|
| | Total Reactor Effluent | Separated Reactor Effluent | | |
| | | Vapor | Liquid | Combined |
| Gravity ° API C$_4$+ | 33.7 | | | 30.5 |
| Sulfur Wt. percent S | 0.7 | | | 0.4 |
| Sed. and Water | 10.2 | 0 | 6.0 | 12.0 |
| Yields: | | | | |
| H$_2$S, NH$_3$ wt. percent | 2.8 | | | 3.0 |
| C$_1$-C$_3$ wt. percent | 8.0 | | | 5.2 |
| C$_4$-400 vol. percent | 37.1 | 31.4 | | 31.4 |
| 400-680 vol. percent | 40.7 | 28.0 | 11.7 | 39.7 |
| 680-975 vol. percent | 18.7 | | 24.6 | 24.6 |
| 975° F.+ vol. percent | 10.8 | | 11.6 | 11.6 |
| | 107.3 | 59.4 | 47.9 | 107.3 |

No difficulties at all were encountered when taking the vapor and liquid streams out separately as indicated in the drawing. If the vapor and liquid products are combined at room temperature, the amount of sediment present in the product was similar to the amount obtained when taking the streams out separately and cooling them together. It is clear that the reduced amount of sediment in the products passing through lines enabled trouble-free runs to continue for long periods.

*Example II*

In attempting to run Mid-Continent vacuum bottoms feed, it was found that an upper limit of 75% conversion was obtained at 2250 pounds per square inch gauge because of the deposition of sediment in the product line carrying the total reactor effluent from reactor conditions to ambient temperatures. The bench scale unit was changed so that liquid and vapor streams could be removed separately from the reactor. It was then possible to operate at a conversion of 89.5% which is far superior in terms of the amounts of lighter products made from the feed. The overall product yields for the two cases are given in Table III:

TALBE III.—CONVERSION OF MID-CONTINENT VACUUM BOTTOMS

| | Inoperable Case | Operable Case | | |
|---|---|---|---|---|
| | | Liquid | Vapor | Combined |
| Gravity °API C$_4$+ | 28.2 | | | 33.3 |
| Sulfur Wt. Percent S | 0.15 | | | 0.18 |
| Sed. and Water | 4.0 | 0.6 | 0.0 | 5.0 |
| C$_4$-400 | 20.0 | | 27.8 | 27.8 |
| 400-680 | 29.0 | 4.4 | 34.2 | 38.6 |
| 680-975 | 30.6 | 10.2 | 20.3 | 30.5 |
| 975° F+ | 26.9 | 10.5 | | 10.5 |
| | 106.5 | | | 107.4 |

No difficulties at all were obtained when operating at the higher conversion for an extended period of time. The sediment and water values for the products, separately and combined, show that it would be impossible to run at the higher conversion without taking the liquid and vapor streams separately.

In addition to the characteristic that the residuum is of a type containing at least 5% (wt.) of asphaltenes, it is normally of the type having at least 30% (vol.) of a fraction boiling above 975° F. In such case, we can continuously operate under conditions to convert in excess of 60% (vol.) of the residuum to materials boiling below 975° F. and frequently above 90% (vol.). Such fraction usually contains 20 wt. percent or more of a fraction boiling in the C$_4$ to 600° F. range.

While we would normally operate a residuum hydrogenation reaction at about 2250 to 3000 p.s.i.g., the useful range is about 1500 to 5000 p.s.i.g. Temperatures will be in the range of 800 to 900° F. and, as before mentioned, liquid flow rates will be sufficient to expand the catalyst bed the desired amount. Liquid velocities will not normally exceed 80 gallons per minute per square foot of horizontal cross section of the reactor. Space velocity is in the range of 0.2 to 2.0 vf./hr./vr., usually 0.4 to 1.5.

While we have shown and described the preferred form of embodiment of our invention it will be apparent that many modifications and variations of the invention as hereinbefore set forth may be made without departing from the spirit and scope thereof and only such limitations should be imposed as are indicated in the appended claims.

We claim:

1. The process of hydrogenating a residual petroleum oil composed of at least 30% of a fraction boiling above 975° F. and having at least 5 wt. percent of asphaltenes which comprises flowing said oil in liquid phase with a hydrogen rich gas upwardly through a contact zone containing a bed of particulate hydrogenation catalyst having a narrow size range between 3 and 270 mesh at a hydrogen pressure, temperature and space velocity such that the conversion of the fraction boiling above 975° F. to a fraction boiling below 975° F. is in the order of 70% with at least 20% boiling below 650° F., maintaining a hydrogen rich gas velocity in the order of 1 to 20 standard cubic feet per pound of hydrocarbon charge, separately withdrawing without cooling two separate reaction effluent streams from the upper part of the contact zone, one of said streams being substantially vapor free liquid and the second stream being substantially liquid free vapor, recycling a portion of said vapor-free liquid stream into the contact zone together with the fresh liquid feed such that the upflow liquid velocity through the bed of catalyst shall be maintained in the range of 1 to 80 gallons per minute per square foot of horizontal cross section of the zone depending upon the particle size and density of the catalyst and the viscosity and density of the liquid to establish at least a 10% expansion of the volume of the bed based upon the settled volume of the bed, and accomplish random motion of the particles without carryover of particles from the zone, and fractionating the liquid effluent stream before cooling thereof, into gaseous, low boiling and heavy boiling fractions, the gaseous and low boiling fractions boiling below 600° F., the heavy boiling fraction being substantially free of sediment.

2. The process of hydrogenating a petroleum oil as claimed in claim 1 in which the recycle of vapor-free liquid is in a path through but out of contact with the bed of catalyst, and in which the liquid enters the path through a funnel and in which the maximum velocity at the mid point of the funnel in the recycle flow path is 0.4 foot per second.

3. The process of hydrogenating a residual petroleum oil composed of at least 30% of a fraction boiling above 975° F. and having at least 5 wt. percent of asphaltenes which comprises flowing said oil in liquid phase with a hydrogen rich gas upwardly through a contact zone containing a bed of particulate hydrogenation catalyst having a narrow size range between 3 and 270 mesh at a hydrogen pressure, temperature and space velocity such that the conversion of the fraction boiling above 975° F. to a fraction boiling below 975° F. is in the order of 70% with at least 20% boiling below 650° F., maintaining a hydrogen rich gas velocity in the order of 1 to 20 standard cubic feet per pound of hydrocarbon charge, separately withdrawing without cooling two separate reaction effluent streams from the upper part of the contact zone, one of said streams being substantially vapor free liquid and the second stream being substantially liquid free vapor, maintaining the upflow liquid velocity through the bed of catalyst in the range of 1 to 80 gallons per minute per square foot of horizontal cross section of the zone depending upon the particle size and density of the catalyst and the viscosity and density of the liquid to establish at least a 10% expansion of the volume of the bed based upon the settled volume of the bed, and accomplish random motion of the particles without carryover of particles from the zone, and fractionating the liquid effluent stream before cooling thereof, into gaseous, low boiling and heavy boiling fractions, the gaseous and low boiling fractions boiling below 600° F., the heavy boiling fraction being substantially free of sediment.

References Cited

UNITED STATES PATENTS

| | | | |
|---|---|---|---|
| 3,151,060 | 9/1964 | Garbo | 208—213 |
| 3,215,617 | 11/1965 | Burch et al. | 208—59 |

DELBERT E. GANTZ, *Primary Examiner.*

A. RIMENS, *Assistant Examiner.*